United States Patent
Chauvin et al.

(10) Patent No.: US 12,325,328 B2
(45) Date of Patent: Jun. 10, 2025

(54) MULTI-PURPOSE BATTERY THERMAL COMPONENT

(71) Applicant: Rivian IP Holdings, LLC, Plymouth, MI (US)

(72) Inventors: Curtis Wesley Chauvin, Orange, CA (US); Shidao Wang, Irvine, CA (US); Jianwu Cao, Irvine, CA (US); Shawn Wood Hanna, New Westminister (CA); Maryam Yazdanpour, Coquitlam (CA)

(73) Assignee: Rivian IP Holdings, LLC, Irvine, CA (US)

( * ) Notice: Subject to any disclaimer, the term of this patent is extended or adjusted under 35 U.S.C. 154(b) by 201 days.

(21) Appl. No.: 17/957,632

(22) Filed: Sep. 30, 2022

(65) Prior Publication Data
US 2024/0109457 A1 Apr. 4, 2024

(51) Int. Cl.
*B60L 58/26* (2019.01)
*B60L 58/27* (2019.01)
*H01M 10/613* (2014.01)
*H01M 10/615* (2014.01)
*H01M 10/63* (2014.01)

(52) U.S. Cl.
CPC .............. *B60L 58/26* (2019.02); *B60L 58/27* (2019.02); *H01M 10/613* (2015.04); *H01M 10/615* (2015.04); *H01M 10/63* (2015.04)

(58) Field of Classification Search
None
See application file for complete search history.

(56) References Cited

U.S. PATENT DOCUMENTS

| | | | |
|---|---|---|---|
| 7,338,335 B1* | 3/2008 | Messano | B60H 1/00428 903/903 |
| 10,093,198 B2* | 10/2018 | Tistle | H02J 7/007182 |
| 2013/0193920 A1* | 8/2013 | Dickerhoof | B60L 53/00 320/109 |
| 2013/0249495 A1* | 9/2013 | Ang | H02J 7/04 320/134 |
| 2014/0012447 A1* | 1/2014 | Gao | B60L 58/13 701/22 |
| 2017/0332449 A1* | 11/2017 | Battaglia | H05B 45/375 |
| 2021/0344213 A1* | 11/2021 | Yebka | H02J 7/007194 |
| 2022/0314837 A1* | 10/2022 | Gupta | B60L 58/26 |
| 2022/0344728 A1* | 10/2022 | Myneni | H01M 10/48 |

* cited by examiner

*Primary Examiner* — Daniel L Greene
(74) *Attorney, Agent, or Firm* — Foley & Lardner LLP

(57) ABSTRACT

Systems, methods, and devices for a multi-purpose thermal component are provided. The system can include a thermal component to interface with a battery and an electrical component, and a controller in electrical communication with the thermal component. The controller can cause the thermal component to charge the electrical component. The controller can cause the thermal component to transfer thermal energy with the battery.

20 Claims, 6 Drawing Sheets

MULTI-PURPOSE BATTERY THERMAL COMPONENT

INTRODUCTION

Battery systems can be deployed in various environments, including at a home, residence, or in an outdoor environment. The battery systems can store power for distribution to various loads, such as an electric vehicle.

SUMMARY

This disclosure is directed to a multi-purpose battery thermal component that can transfer thermal energy with (e.g., heat or otherwise increase the temperature of, cool or otherwise decrease the temperature of) a battery or pre-charge an electric component, such as a capacitor. The technology can be used in conjunction with power distribution systems and related methods for a home or residence, such as an at-home battery pack or system. For example, a thermal component can be provided or arranged both to transfer thermal energy with a battery of the battery system, and function as a resistor to charge an electrical component (such as a capacitor) of the battery system. The thermal component can provide resistance to charge capacitors or other electrical components of the power distribution system, thus permitting elimination of a pre-charge resistor which facilitates charging of pre-charge capacitors. As part of using the thermal component to charge the electrical component or provide heat to the battery, the controller can selectively open and close various contactors and relays to cause the heater to provide heat to the battery or pre-charge the capacitor without the use of a separate or dedicated pre-charge resistor.

At least one aspect is directed to a system. The system can include a thermal component configured to interface with a battery and an electrical component. The system can include a controller in electrical communication with the thermal component. The controller can cause the heater to charge the electrical component. The controller can cause the heater to transfer thermal energy with the battery.

At least one aspect is directed to a method. The method can include causing, by a controller, a thermal component, intermediary to a battery and an electrical component, to charge the electrical component. The method can include causing, by the controller, the thermal component to transfer thermal energy with the battery.

At least one aspect is directed to a power distribution device. The power distribution device can include a thermal component configured to interface with a battery and an electrical component. The power distribution device can include a controller configured to cause the thermal component to charge the electrical component. The controller can be configured to cause the thermal component to transfer thermal energy with the battery.

At least one aspect is directed to a device. The device can include a battery. The device can include a capacitor. The device can include a thermal device arranged intermediary to the battery and the capacitor. The thermal device can heat the battery responsive to a first condition. The thermal device can charge the capacitor responsive to a second condition.

At least one aspect is directed to a method of manufacturing a power distribution device. The method can include providing a battery. The method can include providing an electrical component. The method can include providing a heater configured to interface with the battery and the electrical component. The method can include providing a controller in communication with the heater, to control the heater to heat the battery or charge the electrical component.

At least one aspect is directed to a battery pack. The battery pack can include a battery cell. The battery pack can include a capacitor. The battery pack can include a thermal component arranged intermediary to the battery cell and the capacitor, the heater to provide heat to the battery cell and to charge the capacitor.

At least one aspect is directed to a power distribution device. The power distribution device can include a battery. The power distribution device can include a power converter including a capacitor. The power distribution device can include a heater arranged intermediary to the battery and the power converter. The power distribution device can include a controller communicably coupled to the heater. The controller can detect a start-up condition. The controller can transmit, based on detection of the start-up condition, a first signal to cause the heater to charge the capacitor of the power converter. The controller can detect a temperature condition of the battery. The controller can transmit, based on the temperature condition of the battery, a second signal to cause the heater to provide heat to the battery.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for a multi-purpose heater as a charge resistor. The various concepts introduced above and discussed in greater detail below may be implemented in any of numerous ways.

This disclosure is directed to power distribution systems and related methods for a home or residence, such as an at-home battery pack or system. Heaters or other thermal components in a power distribution system can regulate or otherwise control a temperature of (e.g., by heating or providing heat to, cooling or drawing heat from) a battery pack to improve the efficiency with which the battery pack can be charged or discharged. A pre-charge resistor in a power distribution system can be used to charge a capacitor in the power distribution system upon being initially connected to a power source.

The power distribution system described herein can include or interface with a battery and a thermal component intermediary to the battery and an electrical component (such as a capacitor). A controller communicably coupled to the thermal component can cause the thermal component to charge the electrical component, and cause the thermal component to transfer thermal energy with to the battery.

With this technical solution, the thermal component can provide or serve multiple purposes—e.g., providing heat to or draw heat from the battery and function as a resistor to charge an electrical component (such as a capacitor). The thermal component of this technical solution can provide sufficient resistance to charge capacitors or other electrical components of the power distribution system, thus permitting elimination of the pre-charge resistor which facilitates charging of pre-charge capacitors. As part of using the thermal component to charge the electrical component or provide heat to or draw heat from the battery, the controller can selectively open and close various contactors and relays to cause the heater to provide heat to the battery or pre-charge the capacitor (without the need of a separate or dedicated pre-charge resistor). Thus, the controller of this technical solution can increase efficiency in design and space savings by eliminating redundant components which are being replaced by the dual-purpose thermal component described herein, and can be more reliable as compared to systems which include separate or dedicated components for thermal transfer and pre-charging.

Figure 1:
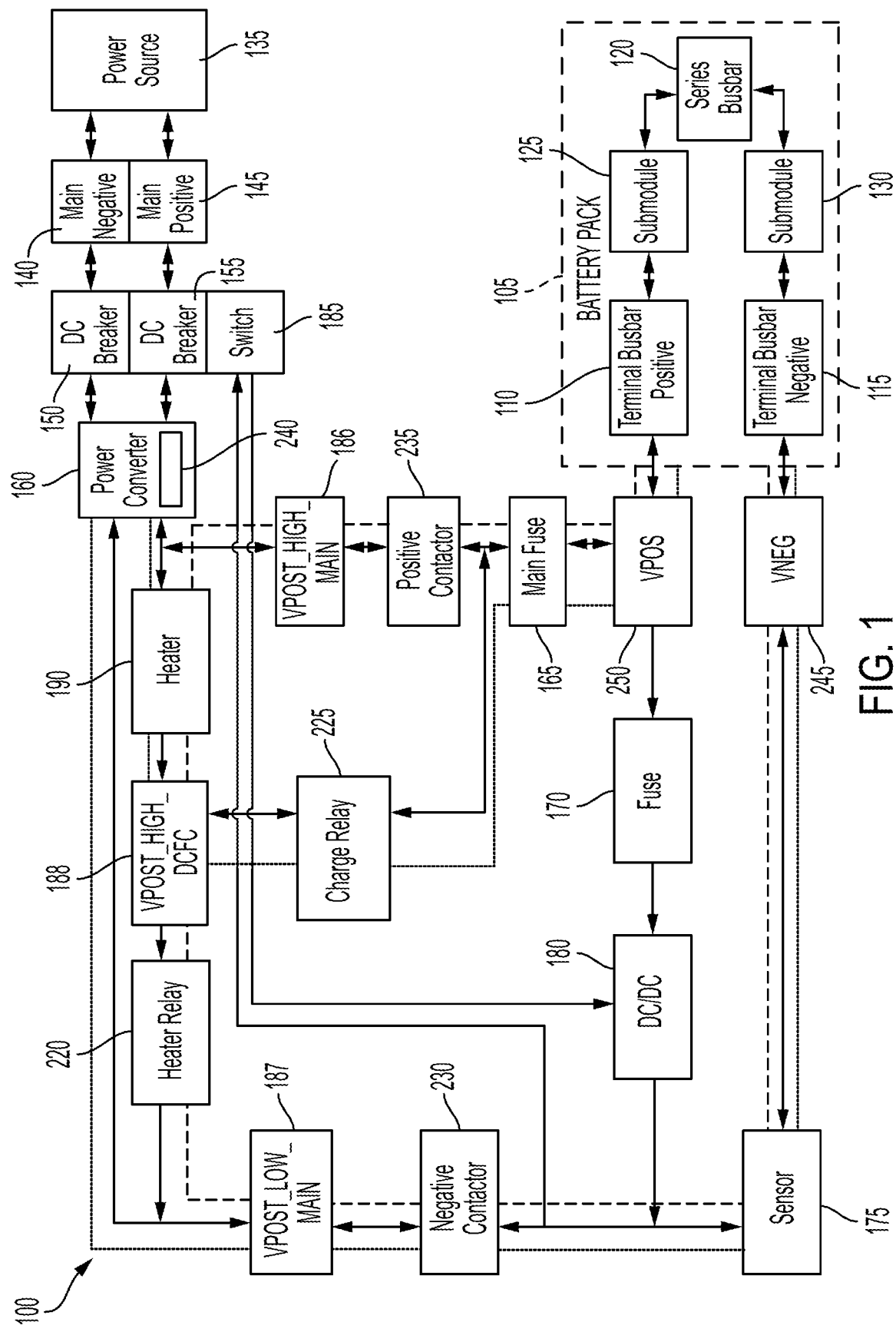
FIG. 1 example block diagram of a battery system, according to some implementations.

FIG. 1 depicts an example block diagram of a battery system 100. The battery system 100 can be or include a residential battery system 100. The residential battery system 100 can be used to provide power to one or more loads of a residence, similar to a generator. The battery system 100 can be or include a vehicle charging battery system 100. The vehicle charging battery system 100 can be used to provide power or charge to one or more batteries of an electric vehicle. The battery system 100 can be used or incorporated in any other power distribution system for various other use cases, to provide power to various other examples of loads. The battery system 100 can be located in an exterior, outdoor, or ambient environment. As part of being located in an ambient environment, and in various instances, the battery system 100 may be exposed to various weather conditions including cold weather temperatures (e.g., at or below freezing temperatures).

The battery system 100 can include a battery pack 105. The battery pack 105 can provide power to, for example, an electric vehicle, a home or residence, or other components, elements, equipment, or load which use electric power. Battery packs 105 can include any arrangement or network of electrical, electronic, mechanical or electromechanical devices to power a load. The battery pack 105 can include at least one housing. The housing can include at least one battery module or at least one battery cell, as well as other battery pack components. The battery module can be or can include one or more groups of prismatic cells, cylindrical cells, pouch cells, or other form factors of battery cells. The housing can include a shield on the bottom or underneath the battery module to protect the battery module or cells from external conditions The battery pack 105 can include busbars 110-120. The busbars 110-120 can include a positive terminal busbar 110, a negative terminal busbar 115, and a series busbar 120. The busbars 110-120 can establish or otherwise facilitate electrical connections between terminals and battery cells of the battery pack 105. The busbars 110-120 can be constructed of copper, for example, though other conductive materials may be used for constructing the busbars 110-120.

The battery pack 105 can include at least one cooling line that can distribute fluid through the battery pack 105 as part of a thermal/temperature control or heat exchange system that can also include at least one thermal component (e.g., cold plate). The thermal component can be positioned in relation to a top submodule and a bottom submodule, such as in between the top and bottom submodules, among other possibilities. The battery pack 105 can include any number of thermal components. For example, there can be one or more thermal components per battery pack, or per battery module. At least one cooling line can be coupled with, part of, or independent from the thermal component.

The battery pack 105 can include at least one submodule 125, 130. For example, the battery pack 105 can include at least one first (e.g., top) submodule 125 or at least one second (e.g., bottom) submodule 130. At least one thermal component can be disposed between the top submodule 125 and the bottom submodule 130. For example, one thermal component can be configured for heat exchange with one battery module of the battery pack 105. The thermal component can be disposed or thermally coupled between the top submodule 125 and the bottom submodule 130. One thermal component can also be thermally coupled with more than one battery module (or more than two submodules 125, 130). The battery submodules 125, 130 can collectively form one battery module. In some examples each submodule 125, 130 can be considered as a complete battery module, rather than a submodule.

The battery modules can each include a plurality of battery cells. The battery modules can be disposed within the housing of the battery pack 105. The battery modules can include battery cells that are cylindrical cells or prismatic cells, for example. The battery module can operate as a modular unit of battery cells. For example, a battery module can collect current or electrical power from the battery cells that are included in the battery module and can provide the current or electrical power as output from the battery pack 105. The battery pack 105 can include any number of battery modules. For example, the battery pack 105 can have one, two, three, four, five, six, seven, eight, nine, ten, eleven, twelve or other number of battery modules disposed in the housing.

The battery system 100 can receive power from a power source 135 to charge the battery pack 105. The power source 135 can include a hybrid inverter subsystem. The hybrid inverter subsystem can be a component of a solar panel or other power source which manages power distributed therefrom. The power source 135 can include a generator, such as a home generator. The power source 135 can include a main power line (e.g., to a home or residence or other building/structure). The power source 135 can output main negative 140 and main positive 145 voltage outputs therefrom to the battery system 100. The main negative 140 and main positive 145 voltage output from the power source 135 can be high voltage, such as voltages ranging between 350-550 direct current (DC) volts. The power source 135 can output the main negative 140 and main positive 145 to respective circuit breakers 150, 155. The circuit breakers 150, 155 can be sized to interrupt at a current draw from the power source 135 exceeding a threshold, such as 25A. The circuit breakers 150, 155 can be arranged intermediary to the power source 135 and a power converter 160. When closed, the circuit breakers 150, 155 can operate to permit power or current flow between power source 135 and power converter 160. The power converter 160 can convert, transform, or step down voltages from the power source 135 to voltages acceptable for charging the battery cells of the battery pack 105. The power converter 160 can convert the voltages from the power source 135 to voltages ranging between 36-50 DC volts, for example.

The battery system 100 can include various other electrical components to facilitate heating or charging the battery pack 105. The battery system 100 can include fuses 165, 170 to interrupt current flow through the battery system 100 in instances of excess current draw, sensor(s) 175 to measure or quantify current or current draw (such as shunt current through the battery system 100, a DC/DC regulator 180 to regulate DC voltages in the battery system 100, one or more switches 185 to selectively open and close the breakers 150, 155 to permit power to flow from the power source 135 to the power converter 160, or other electrical components that can be included or incorporated into the battery system 100. The battery system 100 can also include measurement points at various connections or junctures within the battery system 100, such as VPOST_HIGH_MAIN 186 measuring a main bus positive side voltage, VPOST_LOW_MAIN 187 measuring a main bus negative side voltage, VPOST_HIGH_DCFC 188 measuring a heater bus positive side voltage. Additionally, the differential between one or more of the measurement points can provide readings relating to the battery pack 105. For example, a difference or differential input between the VPOST_HIGH_MAIN 186 and VPOST_LOW_MAIN 187 can provide the battery pack 105 main bus voltage reading. Additionally, a difference or differential input between the VPOST_HIGH_DCFC 188 and VPOST_LOW_MAIN 187 can provide the battery pack 105 thermal bus voltage reading.

The battery system 100 can include thermal component, such as a heater 190. The heater 190 can be or include a low voltage heater, such as a heater designed or manufactured to operate at internal voltages of the battery pack. For example, the heater 190 may be designed or manufactured to operate at voltages within a range of between 36-50 volts. While described herein as a heater 190, the battery system 100 can include any thermal component, such as a dual-purpose heater and heat sink, a cooling element, a fan, heat sink, or other component arranged to provide heat to or draw heat from one or more elements of the battery system 100. The heater 190 can be arranged intermediary to or between the power converter 160 and the battery pack 105. The heater 190 can provide heat to the battery system 100. For example, in instances where the battery system 100 is exposed to cold weather temperatures, the heater 190 can provide heat to increase the temperature of the battery pack 105 or other component of the battery system 100, which can facilitate charging or discharging the battery pack 105 or improve the efficiency with which the battery pack 105 is charged or discharged. The heater 190 can be arranged, located, or otherwise positioned near the battery pack 105, to provide heat to the battery pack 105. The heater 190 can include an internal resistance such that, when current flows through the heater 190 or the heater 190 is otherwise powered on, the heater has some level of resistance. The heater 190 can have a resistance of approximately 5 ohms, though other heaters 190 may have different resistances depending on the type of heater 190. In this regard, a resistor of the battery system 100 can function or otherwise operate as a heater 190 and as a pre-charge component for a capacitor. For example, since the heater 190 has a resistance, the heater 190 can operate as a pre-charger or pre-charge resistor for a capacitor of the battery system 100. Additionally, the heater 190 can provide heat to the battery system 100. The battery system 100 can include various contactors, relays, and switches to control current flow through the battery system 100, to cause the heater 190 to charge one or more electrical components or to cause the heater 190 to provide heat to the battery pack 105.

Figure 2:
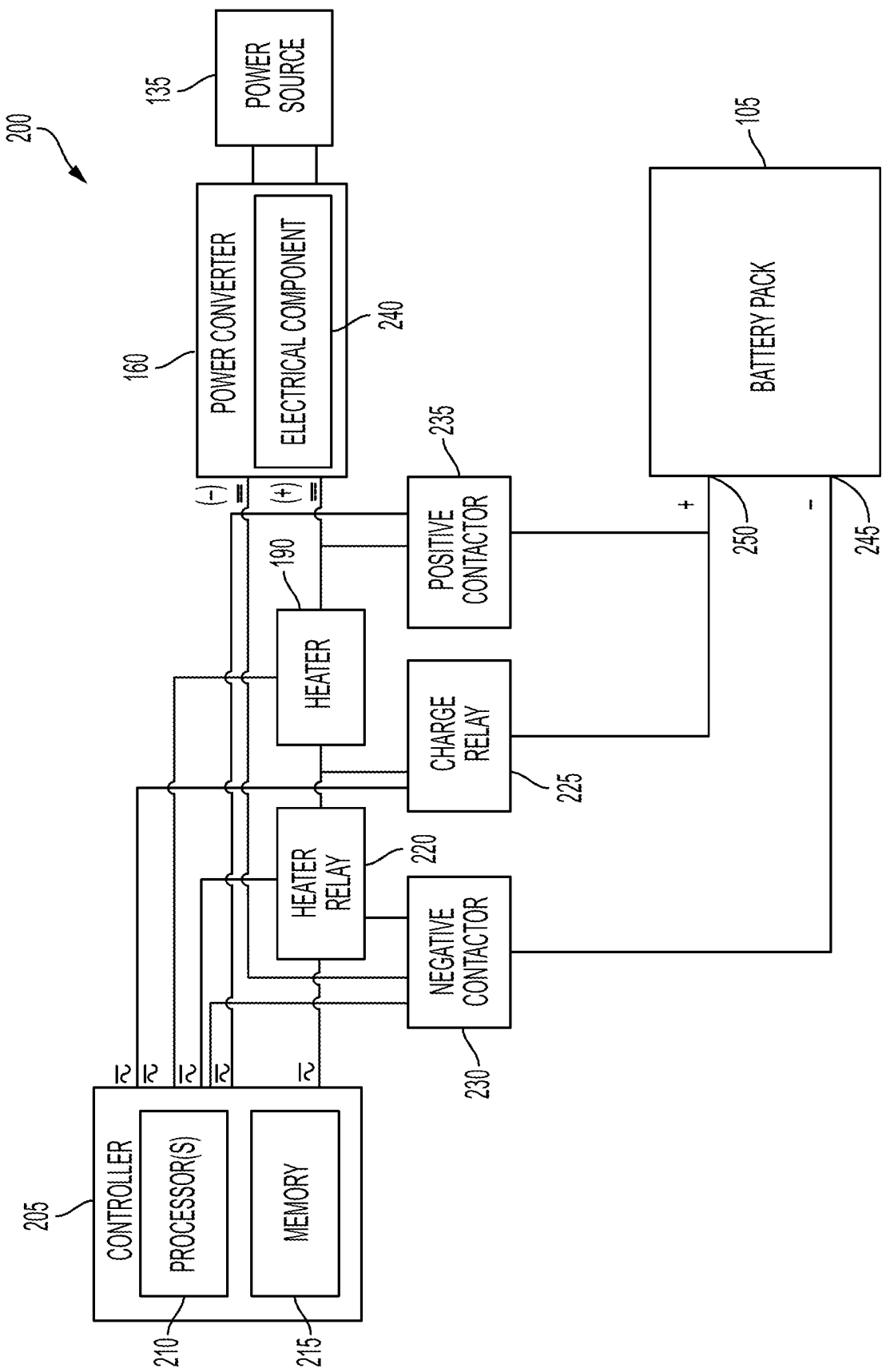
FIG. 2 depicts an example block diagram of a system for controlling the battery system of FIG. 1, according to some implementations.

FIG. 2 depicts an example block diagram of a system 200 for controlling a dual-purpose battery heater as a pre-charge resistor, in accordance with some implementations. The system 200 can include, interface with, or control one or more systems, components or elements shown in FIG. 1, such as the battery pack 105 or power converter 160. The system 200 can control current flow through the battery system 100. The system 200 can control the heater 190 to provide heat to the battery system 100 including one or more batteries or battery cells. The system 200 can control or cause the heater 190 to charge one or more electrical components of the battery system 100.

The system 200 can include a controller 205. The controller 205 can be a component of the battery system 100 of FIG. 1. The controller 205 can be an external component communicably coupled to the battery system 100 (e.g., through one or more buses, interconnects, or network). The controller 205 can be similar to the computing device or computing system 600 described below with reference to FIG. 6. The controller 205 can include one or more processors 210 similar to the processer 610 described below, and memory 215 similar to the main memory 615 described below. The controller 205 can be communicably coupled to the heater 190, along with a heater relay 220, a charge relay 225, a negative contactor 230, and a positive contactor 235. The controller 205 can output signals to the heater 190, heater relay 220, charge relay 225, negative contactor 230, and positive contactor 235, to control a flow of current through the battery system 100.

The power converter 160 can include an electrical component 240. The power converter 160, including the electrical component 240, can be arranged intermediary between the power source 135 and the battery pack 105. The electrical component 240 can be a component which is charged prior to power from the power converter 160 flowing to the battery system 100. The electrical component 240 can be charged to maintain a steady or consistent voltage from the power converter 160 to the battery system 100. For example, the electrical component 240 can be charged to maintain a voltage from the power converter 160 to the battery system 100 of +/−1V, +/−2V, +/−5V, or any other range of voltages suitable for charging the battery pack 105. The electrical component 240 can be or include, for instance, one or more capacitors. The capacitors can be rated to maintain a voltage output from the power converter, at the 36-50V DC range suitable to charge the battery pack 105. For example, the capacitors can be or include 39.6 mF capacitors, though other sized or rated capacitors can be used depending on the particular configuration of the battery system 100.

The system 200 can include one or more relays, including a heater relay 220 and a charge relay 225. The relays 220 or 225 can include switches which open and close responsive to signals received from one or more devices or components, such as the controller 205. The heater relay 220 can be arranged intermediary between the heater 190 and the battery pack 105, such as a negative terminal 245 of the battery pack 105. The charge relay 225 can also be arranged intermediary between the heater 190 and the battery pack 105, such as a positive terminal 250 of the battery pack 105. The charge relay 225 can be arranged intermediary between the positive terminal 250 and an output side of the heater 190 (e.g., at a junction between the heater 190 and the heater relay 220).

The system 200 can include one or more contactors, including a negative contactor 230 and a positive contactor 235. The contactors 230 or 235 can include switches which open and close responsive to signals received from one or more devices or components, such as the controller 205. The contactors 230 and 235 can be arranged proximate to the positive and negative terminals 245, 250. For example, the negative contactor 230 can be arranged intermediary to the heater relay 220 and the negative terminal 245. The positive contactor 235 can be arranged intermediary between the positive terminal 250 and the heater 190. The positive contactor 235 can be arranged between the positive terminal 250 and an input side of the heater 190 and output of the power converter 160 (e.g., at a junction between the positive DC output from the power converter 160 and the heater 190). The controller 205 can communicate, send, provide, or otherwise transmit various signals to the relays 220, 225 and contactors 230, 235, to selectively open and close the relays 220, 225 and contactors 230, 235, so as to control a flow of current through the battery system 100.

Figure 3:
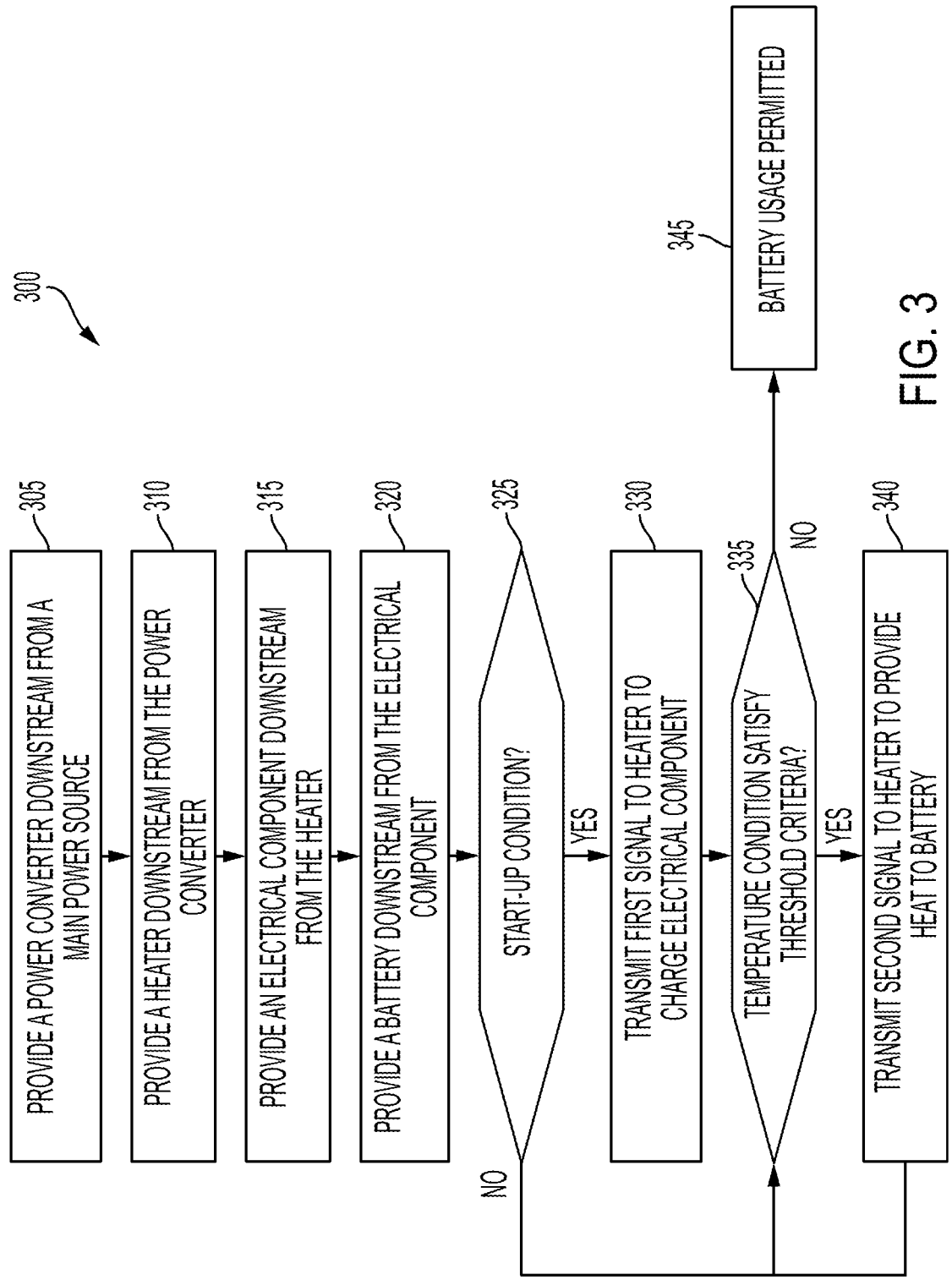
FIG. 3 depicts a flowchart showing an example method of controlling the battery system of FIG. 1, according to some implementations.

FIG. 3 depicts a flowchart showing an example method 300 of controlling the battery system 100. The method 300 is being described with reference to the elements, components, or hardware described above with reference to FIG. 1-FIG. 2, among others. At ACT 305, the method 300 can include providing a power converter 160. At ACT 310, the method 300 can include providing an electrical component 240. At ACT 315, the method 300 can include providing a battery. At ACT 320, the method 300 can include providing a heater 190. At ACT 325, the method 300 can include identifying whether a start-up condition is present. At ACT 330, the method 300 can include transmitting a first signal to the heater 190 to charge the electrical component 240. At ACT 335, the method 300 can include determining whether a temperature condition satisfies a threshold criteria. At ACT 340, the method 300 can include transmitting a second signal to the heater 190 to provide heat to the battery. At ACT 345, the method 300 can include permitting battery usage.

Still referring to FIG. 3, at ACT 305, the method 300 can include providing a power converter 160. ACT 305 can include providing a power converter 160 to receive power from a power source 135. The power source 135 can be or include a solar power source, a generator, a main power line, or any other power source 135 arranged to provide power to the battery system 100 to charge the battery pack 105. The power converter 160 can be or include a DC-to-DC power converter. The power converter 160 can be a transformer to convert DC power from the power source 135 at a first voltage to DC power at a second voltage. During charging of the battery, the power converter 160 can be arranged downstream from the power source 135 with respect to power flow from the power source 135.

At ACT 310, the method 300 can include providing an electrical component 240. ACT 310 can include providing the electrical component 240 in electrical connection with a heater 190. The electrical component 240 can be included in or a component of the power converter 160. For example, the electrical component 240 can be arranged intermediary between the power source 135 and the heater 190. The electrical component 240 can be arranged intermediary between the power converter 160 and the heater 190 or the battery pack 105. The electrical component 240 can be charged to provide a stable or steady voltage from the power converter 160. The electrical component 240 can be a capacitor, such as a pre-charge capacitor. The electrical component 240 can have a depleted or reduced charge in various instances, such as when the battery system 100 is powered down or otherwise deactivated. The electrical component 240 can have a depleted or reduced charge prior to the battery system 100 being started at a subsequent point in time, following being powered-down.

At ACT 315, the method 300 can include providing a battery. ACT 315 can include providing a battery in electrical communication with the power converter 160. The battery can be or include a battery pack 105 including one or more battery cells of the battery pack 105. The battery can be provided proximate to, adjacent to, or otherwise near the heater 190 such that the heater 190 can provide heat to the battery 105 in various instances. The battery can be provided to receive power from the power converter 160, to charge the battery.

At ACT 320, the method 300 can include providing a heater 190. ACT 320 can include providing the heater 190 in electrical communication with the power converter 160. The heater 190 can be or include a low voltage heater 190 arranged to provide heat to one or more components of the battery system 100, such as the battery or battery pack 105. When powered on, the heater 190 can have an internal resistance. The heater 190 can be provided to receive power from the battery (e.g., provided at ACT 315). The heater 190 can be provided in communication with a controller. The heater 190 can be provided to selectively charge the electrical component 240 or to provide heat to the battery or battery pack 105, as described in greater detail below.

The method 300 can include providing one or more relays. The one or more relays can include a first relay and a second relay. The first relay can be the heater relay 220 corresponding to the heater 190. The second relay can be the charge relay 225 corresponding to the electrical component 240. The first relay can be provided intermediary to the heater and a negative terminal. The negative terminal can be or include a negative terminal 245 of the battery provided at ACT 315. The first relay can be provided downstream from (e.g., at an output-side of) the heater. The first relay can be provided such that current flowing through the heater flows to the first relay towards the negative terminal 245 (e.g., where the first relay is closed to permit current flowing therethrough). The second relay can be provided intermediary to the heater and a positive terminal. Similar to the negative terminal, the positive terminal can be or include a positive terminal 250 of the battery provided at ACT 315. The first and second relays can be provided in communication with (e.g., communicably coupled to) the controller 205. The first and second relays can selectively open and close responsive to signals received from the controller.

The method 300 can include providing one or more contactors. The one or more contactors can include a first contactor and a second contactor. The first contactor can be the negative contactor 230 corresponding to the negative terminal. The second contactor can be the positive contactor 235 corresponding to the positive terminal. The negative and positive terminals can be or include the negative and positive terminals 245, 250 of the battery provided at ACT 315. The first and second contactors can be communicably coupled to the controller 205. The first and second contactors can selectively open and close responsive to signals received from the controller.

At ACT 325, the method 300 can include identifying whether a start-up condition is present. A start-up condition can refer to, for example, connecting the battery pack or power converter to an electric circuit at a residence or commercial location or to a power source 135. ACT 325 can include identifying, by the controller 205, a start-up condition. The controller 205 can identify the start-up condition responsive to the battery system 100 being turned on or otherwise activated. The controller 205 can identify the start-up condition responsive to determining that the battery system 100 is being activated following expiration of a predetermined duration or period. The controller 205 can maintain a clock to measure a duration in which the battery system 100 is deactivated. The controller 205 can identify the start-up condition responsive to detecting an activate signal (e.g., either manually or automatically selected or generated) and the duration exceeding a predetermined threshold. The predetermined threshold can include, for example, a predetermined number of minutes, hours, or days. The predetermined threshold can be a threshold set or otherwise defined in which a charge of the electrical component 240 is likely to have reduced below a threshold charge. For example, after the battery system 100 is turned off, remaining charge within the battery system 100 (including the electrical component 240) may dissipate. The charge of the electrical component 240 may reduce or dissipate to less than a threshold charge level. The threshold charge level may be sufficient charge such that voltages from the power converter 160 (e.g., regulated by the electrical component 240) are steady-state. Where the charge level of the electrical component 240 is less than or otherwise does not satisfy the threshold charge level, the voltages from the power converter 160 may fluctuate at start-up. As such, the predetermined threshold for the duration used by the controller 205 may correspond to a duration in which remaining charge within the battery system 100 is likely to dissipate such that the charge level of the electrical component 240 is below the threshold charge level.

Where the controller 205 does not identify the start-up condition at ACT 325, the method 300 can proceed to ACT 335. Where the controller 205 identifies the start-up condition at ACT 325, the method 300 can proceed to ACT 330.

At ACT 330, the method 300 can include transmitting a first signal to cause the heater 190 to charge the electrical component 240. The controller 205 can transmit the first signal to the heater 190, to cause the heater 190 to charge the electrical component 240. The controller 205 can transmit the first signal prior to power from the power converter 160 flowing through the battery system 100 to charge the battery pack 105 of the battery system 100.

Referring back to FIG. 1, to cause the heater 190 to charge the electrical component 240, the controller 205 can transmit various other signals to open or close the contactors or relays. The controller 205 can transmit various signals to open or close the contactors or relays, to cause current from the battery 105 to flow through the battery system 100 such that the heater 190 functions as a charge resistor to charge the electrical component 240. The controller 205 can transmit signals to open/close the contactors or relays, to cause current from the battery 105 to flow through the battery system 100 along the path illustrated as a dotted line. For example, the controller 205 can transmit a signal to the positive contactor 235 to open the positive contactor 235, and transmit a signal to the heater relay 220 to open the heater relay 220. The controller 205 can transmit a signal to the negative contactor 230 to close the negative contactor 230, and transmit a signal to the charge relay 225 to close the charge relay 225. After opening and closing the contactors and relays 220-235 as provided, current from the battery pack 105 can flow from the positive terminal 250 through the charge relay 225 (e.g., bypassing the open circuit caused by the positive contactor 235), through the heater 190 (which is functioning as a charge resistor) to the power converter 160 to charge the electrical component 240, then through the negative contactor 230 back to the negative terminal 245.

Referring again to FIG. 3, the controller 205 can maintain the configuration (e.g., the relays and contactors 220-235 in their open and closed state) for a duration sufficient to charge the electrical component 240. The controller 205 can maintain the configuration for a duration of, for instance, 10 ms, 50 ms, 100 ms, 500 ms, 1 s, or any other duration sufficient to charge the electrical component 240. After expiration of the duration, the method 300 can proceed to ACT 335.

At ACT 335, the method 300 can include determining whether a temperature condition satisfies a threshold criteria. The controller 205 can determine whether the temperature condition satisfies the threshold criteria. The controller 205 can determine the temperature condition at various intervals. For instance, the controller 205 can sample, detect, or otherwise determine the temperature condition every five minutes, 10 minutes, 15 minutes, 30 minutes, every hour, every two hours, or any other sampling time or interval. The controller 205 may determine the temperature condition via one or more temperature sensors. The temperature sensor(s) may be arranged or provided at a location to measure a temperature of the battery pack 105. The temperature sensor(s) may be arranged or provided at a location to measure an ambient temperature (e.g., of an environment which includes the battery system 100). The controller 205 may receive value or data from the temperature sensor(s) indicative of the temperature condition. The controller 205 may determine the temperature condition via one or more remote sources or data feeds. The controller 205 may receive the temperature condition from an external source, such as a weather reporting service, an application, or any other external source which can send, publish, or otherwise provide temperature conditions to devices. The controller 205 can apply the temperature condition to a threshold temperature. The threshold temperature can be or include a minimum temperature for the battery pack 105, a minimum ambient temperature, or any other threshold temperature. The threshold temperature may be or include, for example, 32° F., 40° F., 50° F., or any other threshold temperature. The threshold temperature can be or include a maximum temperature of the battery pack 105, a maximum ambient temperature, or any other threshold temperature. For instance, the threshold temperature may be or include 75° F., 90° F., 100° F., or any other threshold temperature. The controller 205 can apply the temperature condition to the threshold temperature, to determine whether or not to provide heat to or draw heat from the battery pack 105.

The controller 205 can determine whether the temperature condition satisfies the threshold criteria responsive to applying the temperature condition to the threshold temperature. The controller 205 can determine that the temperature condition satisfies the threshold criteria responsive to determining that the temperature condition is, for example, less than or equal to the threshold temperature where the threshold temperature is a minimum threshold temperature. The controller 205 can determine that the temperature condition satisfies the threshold criteria responsive to determining that the temperature condition is, for example, greater than or equal to the threshold temperature where the threshold temperature is a maximum threshold temperature. The controller 205 can determine that the temperature condition does not satisfy the threshold criteria responsive to determining that the temperature condition is, for example, greater than or equal to the minimum threshold temperature, less than or equal to the maximum threshold temperature, or otherwise within a range of temperatures which do not exceed or fall below a defined thermal energy transfer threshold.

Where, at ACT 335, the controller 205 determines that the temperature condition satisfies the threshold criteria, the method 300 can proceed to ACT 340. At ACT 340, the method 300 can include transmitting a second signal to cause the heater 190 to provide heat to the battery. The controller 205 can transmit the second signal to the heater 190, to cause the heater 190 to provide heat to the battery. Similar to the first signal, the controller 205 can transmit the second signal prior to power from the power converter 160 flowing through the battery system 100. While described as causing the heater 190 to provide heat to the battery, where the temperature condition satisfies the threshold criteria by being greater than (or equal to) a maximum threshold temperature, ACT 340 may include transmitting a second signal to cause the thermal component to draw heat from the battery. In this regard, ACT 340 may include transmitting one or more signals to cause the thermal component to transfer thermal energy with the battery (e.g., either by heating or cooling the battery).

Referring again to FIG. 1, to cause the heater 190 to provide heat to the battery, the controller 205 can transmit various other signals to open or close the contactors or relays. The controller 205 can transmit various signals to open or close the contactors or relays, to cause current from the battery 105 to flow through the battery system 100 to activate the heater 190 to provide heat to the battery 105. The controller 205 can transmit signals to open or close the contactors or relays, to cause current from the battery 105 to flow through the battery system 100 along the path illustrated as a dashed line. For example, the controller 205 can transmit a signal to the charge relay 225 to open the charge relay 225. The controller 205 can transmit a signal to the negative contactor 230 to close the negative contactor 230, transmit a signal to the positive contactor 235 to close the positive contactor, and transmit a signal to the heater relay 220 to close the heater relay 220. After opening and closing the contactors and relays 220-235 as provided, current from the battery pack 105 can flow from the positive terminal 250 through the positive contactor 235 (e.g., bypassing the open circuit caused by the charge relay 225), and to the heater 190 to power or otherwise activate the heater 190. Current flowing through the heater 190 then flows back to the negative terminal 245 through the heater relay 220 and the negative contactor 230.

Referring back to FIG. 3, the controller 205 can maintain the configuration (e.g., the relays and contactors 220-235 in their open and closed state) for a duration sufficient for the heater 190 to provide heat to the battery pack 105. The method 300 can loop back to ACT 335 and maintain the configuration until the controller 205 determines that the temperature condition does not satisfy the threshold criteria. In this regard, the controller 205 can maintain the configuration of the relays and contactors 220-235 until the battery pack 105 is sufficiently heated (e.g., is heated to a temperature which exceeds a threshold value, which can be the same threshold used at ACT 335 for triggering heating or can be a different threshold value such as a higher temperature). The controller 205 can also maintain the configuration for a duration of, for instance, one minute, five minutes, 10 minutes, or any other duration sufficient for the heater 190 to provide heat to the battery pack 105. Once the heater 190 provides sufficient heat to the battery pack 105, the method 300 can proceed to ACT 345.

At ACT 345, the method 300 can include permitting battery usage. Permitting battery usage can include, for example, opening or closing one or more switches, relays, contactors, such that current flows from the power converter 160 to the battery or battery pack 105 to charge the battery pack 105. In this regard, the permitting battery usage can include permitting charging of the battery pack 105 via the power converter. The battery usage can be permitted responsive to the battery pack 105 being sufficiently heated (e.g., such that a temperature condition meets or exceeds a threshold temperature) and the electrical component 240 being charged to a sufficient charge level (e.g., such that voltage from the power converter 160 is stable or steady enough to charge the battery pack 105).

Figure 4:
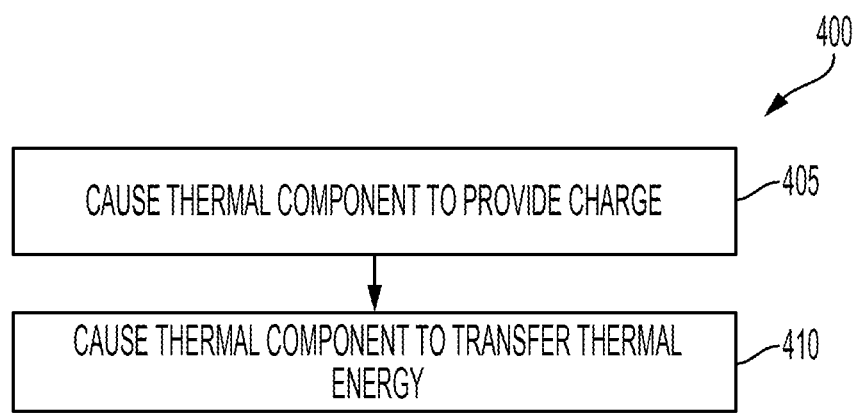
FIG. 4 depicts a flowchart showing an example method of controlling a thermal component, according to some implementations.

FIG. 4 depicts a flowchart showing an example method 400 of controlling a thermal component, such as a heater. The method 400 can be performed by the components, elements, or hardware described above with reference to FIG. 1-FIG. 2. As a brief overview, at ACT 405, the method 400 can include causing a thermal component to provide a charge. At ACT 410, the method 400 can include causing the thermal component to transfer thermal energy.

Prior to execution of ACTS 405 and 410, the method 400 can include providing a heater, power converter, or an electrical component. For example, the method 400 can include steps or ACTS similar to ACT 305 through ACT 320 shown in FIG. 3 and described above.

At ACT 405, the method 400 can include cause a thermal component to provide a charge. The thermal component can be or include a heater. The heater can provide charge to an electrical component. The thermal component can be or include a cooling element. For example, the thermal component can be or include a heat sink and fan. ACT 405 can include transmitting, by a controller, a first signal to a thermal component (such as a heater) intermediary to a battery and an electrical component. The first signal can cause the heater to provide a charge to the electrical component. The first signal can cause the heater to charge the electrical component. The controller can transmit the first signal to the heater to activate the heater for a duration to charge the electrical component. For instance, the controller can transmit the first signal to the heater to cause the heater to charge the electrical component for a first duration. The first duration can be a duration sufficient to charge an electrical component.

ACT 405 can be performed responsive to identifying a start-up condition. The method 400 can include determining whether a start-up condition is detected. For example, the method 400 can include a step or ACT similar to ACT 325 of FIG. 3 and described above. ACT 405 can be performed responsive to the controller identifying the start-up condition. The controller can determine that the start-up condition is detected based on a charge or charge level of the electrical component. As described above, the electrical component can be or include one or more capacitors. The controller can determine that the capacitor(s) have a charge less than a threshold or threshold value. The controller can determine that the capacitor(s) have a charge less than the threshold responsive to the battery system being in a deactivated or off state for a predetermined duration, such that the charge of the capacitor(s) has dissipated or depleted to a value less than the threshold. The controller can identify the start-up condition responsive to determining that the battery system has been in the deactivated or off state for the predetermined duration. The controller can perform ACT 405, to transmit the first signal to the heater to cause the heater to charge the capacitor, responsive to determining that the charge of the capacitor is less than the threshold charge.

As part of causing the heater to charge the electrical component, the method 400 can include transmitting one or more additional signals to one or more relays or one or more contactors. For example, the controller can send, communicate, transmit, or otherwise provide one or more signals to various relays and contactors, to cause power to flow from the battery through the heater to the electrical component, to charge the electrical component. The heater can function as or otherwise operate as a charge resistor, to cause the electrical component to charge. The controller can maintain the configuration of the relays and contactors, to cause power to flow to the electrical component to charge the electrical component, for a duration sufficient to charge the electrical component.

The method 400 can include determining that the electrical component is charged above a threshold value. The controller can determine that the electrical component is charged above a threshold value, responsive to performing ACT 405. The controller can determine that the electrical component is charged above the threshold value responsive to the controller maintaining the configuration of the relays and connectors which causes power to flow to the electrical component for the duration. The controller can transmit additional signals to the relay(s) or contactor(s) responsive to the electrical component being charged above the threshold. The controller can transmit additional signals to the relay(s) or contactor(s) responsive to expiration of the duration, indicating that the electrical component is charged to a charge level which satisfies the threshold. The controller can transmit the additional signal(s) to the relay(s) and or contactor(s) to cause power to flow from the power converter to the battery, to charge the battery.

At ACT 410, the method 400 can include causing the thermal component to transfer thermal energy. The thermal component can transfer thermal energy with the battery. The thermal component can transfer thermal energy by drawing heat from the battery. For example, the thermal component can be or include a cooling element, such as a heat sink and fan. The thermal component can transfer thermal energy by providing heat to the battery. For example, the thermal component can be or include a heater. ACT 410 can include the controller transmitting a second signal to the heater to cause the heater to provide heat to the battery. ACT 410 can include the controller transmitting the second signal to the heater to cause the heater to draw heat from the battery. The first signal (e.g., sent at ACT 405) and the second signal (e.g., sent at ACT 410) can be or include the same signal. For instance, the same signal(s) can trigger or otherwise cause performance of both ACTs 405 and 410. The controller can transmit the second signal to the heater responsive to identifying a temperature condition corresponding to the battery. The controller can identify the temperature condition using, based on, or according to a signal from a temperature sensor.

The temperature sensor can be arranged to measure, quantify, sense, or otherwise identify the temperature condition. The temperature condition can be or include a temperature of the battery or battery pack. The temperature condition can be or include an ambient temperature of the battery system. The controller can compare the temperature condition to a threshold. The threshold can be or include a minimum temperature, a minimum range of temperatures, or any other minimum threshold value. The threshold can be or include a maximum temperature, a maximum range of temperatures, or any other maximum threshold value. The controller can determine whether the temperature condition satisfies a threshold criteria based on the comparison (e.g., based on the temperature condition being less than or equal to the minimum threshold temperature, based on the temperature condition being greater than or equal to the maximum threshold temperature). The controller can transmit the second signal responsive to the temperature condition satisfying the threshold criteria.

The controller can transmit the signal to the thermal component to activate the thermal component for a duration, to cause the thermal component to transfer thermal energy with the battery. The duration in which the thermal component is activated to transfer thermal energy with the battery can be greater than the duration used at ACT 405 to charge the electrical component. The controller can transmit the signal to cause power to flow from the battery to the thermal component (such as a heater), to activate the heater. As part of causing power to flow from the battery to the heater, the controller can communicate, provide, send, or otherwise transmit additional signal(s) to the relay(s) or contactors to cause power to flow from the battery to the heater. The controller can maintain the configuration of the relay(s) or contactor(s) for the duration sufficient to provide heat to the battery. The controller can maintain the configuration while the controller identifies one or more additional temperature conditions corresponding to the battery during heating. The controller can maintain the configuration until the additional temperature condition(s) satisfy a heating threshold. The heating threshold may be the same threshold used by the controller to trigger heating (e.g., used to trigger performance of ACT 410). The heating threshold may be a different threshold (e.g., a minimum temperature to which the battery should be heated). Once at least one of the additional temperature condition(s) satisfy the heating threshold, the controller can transmit subsequent signal(s) to the relay(s) or contactor(s), to cause power to flow from the power converter to the battery to charge the battery.

Following ACTS 405 and 410, the method 400 can include permitting charge of the battery. The controller can permit charge of the battery by sending one or more signals to the contactor(s) or relay(s), along with any additional switches, to permit power to flow from the power source to the power converter, and from the power converter to the battery to charge the battery.

Figure 5:
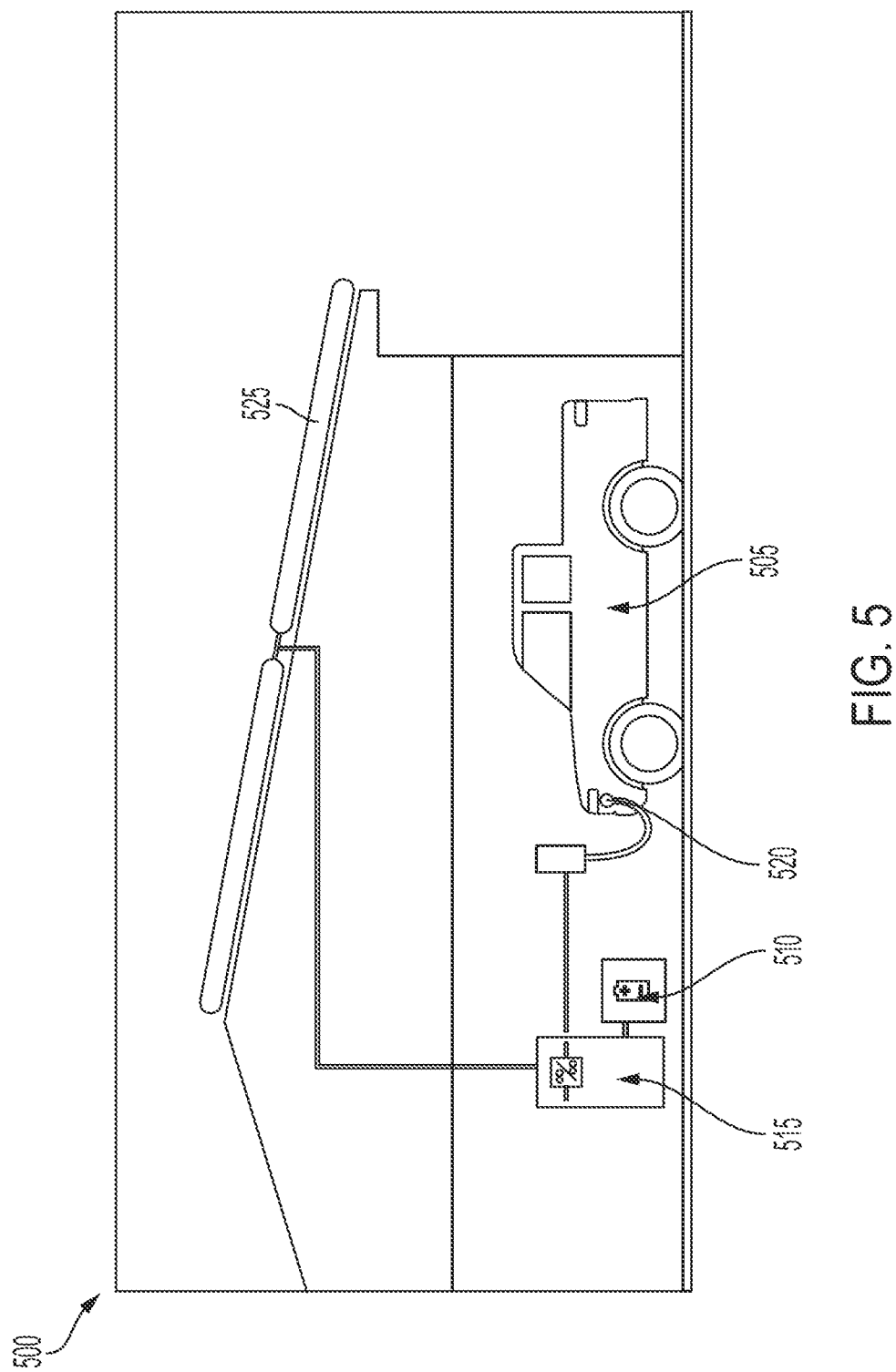
FIG. 5 depicts an illustration of a system, according to some implementations.

FIG. 5 depicts an example illustration of a system 500, according to some implementations. FIG. 5 depicts one example environment in which the systems and methods described herein can be deployed, utilized, located, or otherwise provided. The system 500 can be or can include an energy storage system (e.g., a stationary energy storage system, a residential energy storage system). For example, the system 500 can store and release energy in the form of electricity. The system 500 can facilitate providing power to one or more stationary, or non-stationary, areas such as a building (e.g., a residential home, a commercial building, or other areas). The system 500 can include one or more of the components or elements described above with reference to FIG. 1-FIG. 4. For example, the system 500 can include at least one battery 510 (e.g., a stationary battery or another type of battery) for storing and releasing energy. The battery 510 can be similar to the battery pack 105 described above.

The system 500 can include at least one electric vehicle 505. For example, the electric vehicle 505 can include at least one battery pack (e.g., having one or more battery modules or battery cells) that provides power for the electric vehicle 505. Electric vehicles 505 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. For example, the electric vehicle 505 can include a bi-directional electric vehicle such that electricity can flow to or from the battery pack such that the battery pack can be used as an energy storage system to power an area (e.g., building) of the system 500. For example, the system 500 can include at least one charging port 520 that electrically couples the electric vehicle 505 with an area of the system 500, such as a building (e.g., with one or more electrical power sources of the building, such as an electrical grid). Through the charging port 520, the electric vehicle 505 can both receive electrical charge (e.g., to charge the battery cell(s) of the electric vehicle 505) and output electric charge (e.g., from the battery cell(s) of the electric vehicle 505 to a power source of the building).

The system 500 can include at least one energy source 525. For example, the energy source 525 can include, but is not limited to, a renewable energy source (e.g., solar panels, wind turbines, hydroelectric turbines, or another renewable energy source), or nonrenewable energy source (e.g., electricity grid or another nonrenewable energy source). The energy source 525 can electrically couple with an area of the system 500, such as a building, such that the energy source 525 can provide electrical power to the building. As one example, the energy source 525 can include a solar panel coupled with a portion of the building, such as a roof. The solar panel can provide electricity for the building.

The electric vehicle 505, the battery 510, or the energy source 525, can each couple with one another. For example, the system 500 can include at least one energy control hub 515. The energy control hub 515 can include elements, components, or hardware similar to the components described above with reference to FIG. 1-FIG. 2. For example, the energy control hub 515 can include the controller 205, the heater 190, relays 220-225, contactors 230-235, power converter 160, or any other components described above with reference to FIG. 1-FIG. 2. The energy control hub 515 can be or can include an inverter, such as a bi-directional inverter for DC to AC power conversion across charging between the electric vehicle 505, the battery 510, or the energy source 525. The electric vehicle 505, the battery 510 (e.g., one or more battery cells), and the energy source 525 can each electrically couple with the control hub 515 such that electrons can flow between the electric vehicle 505, the battery 510, and the energy source 525. The control hub 515 can be or can include at least one processing system to facilitate controlling electricity flow within the area, such as a residential home or commercial building. In other words, the control hub 515 can control electricity flow between the electric vehicle 505, the battery 510, the energy source 525, and the power source of the building.

Figure 6:
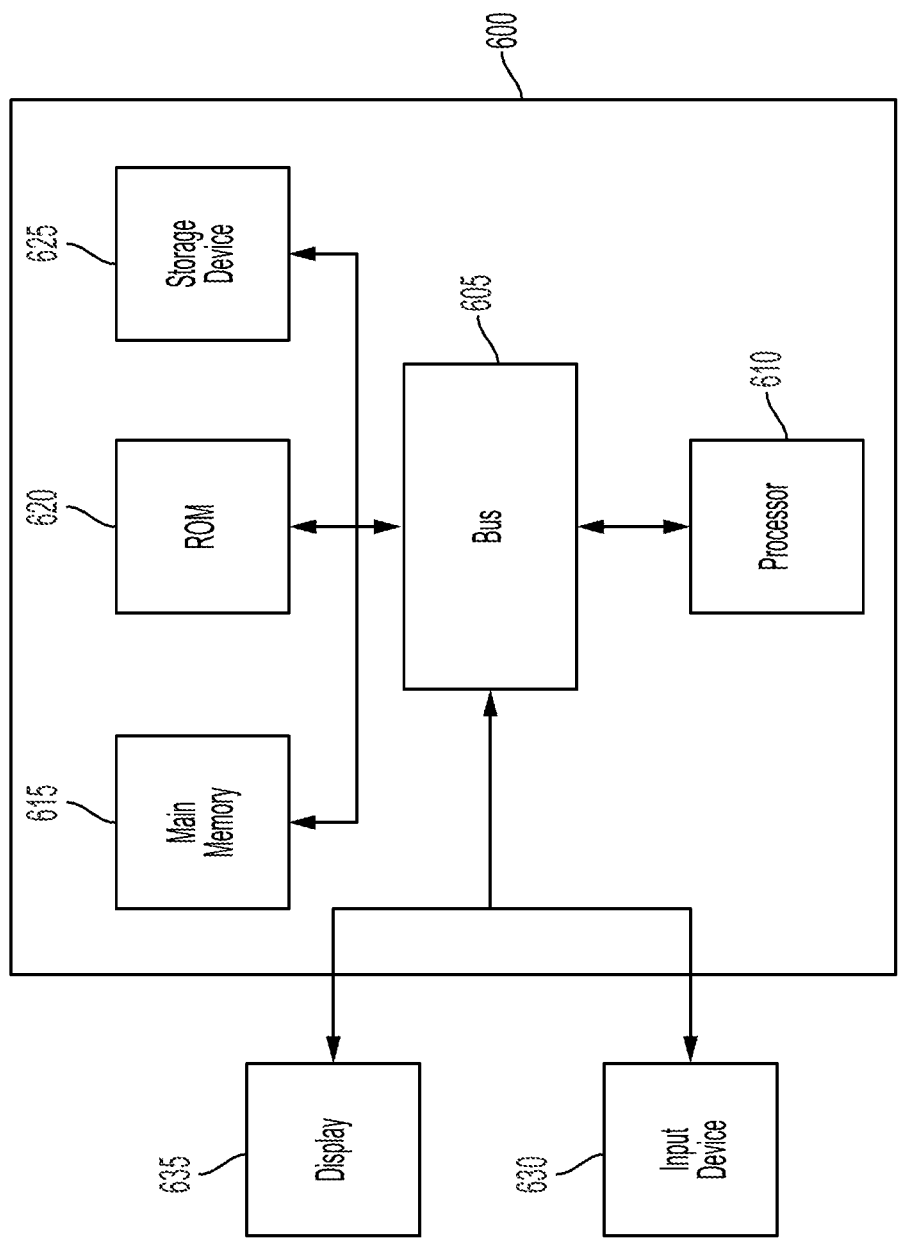
FIG. 6 is a block diagram illustrating an architecture for a computer system that can be employed to implement elements of the systems and methods described and illustrated herein.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of an electric vehicle or other end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   a thermal component configured to interface with a battery and an electrical component disposed across terminals for a stationary power source configured to charge the battery; and
   a controller in electrical communication with the thermal component, the controller to, prior to electrically coupling the stationary power source with the battery:
      cause the thermal component to charge the electrical component for a first predetermined duration; and
      cause the thermal component to transfer thermal energy with the battery for a second duration greater than the first predetermined duration.

2. The system of claim 1, wherein the electrical component comprises a capacitor, wherein the controller causes the thermal component to charge the capacitor, and wherein, prior to causing the thermal component to charge the capacitor, a charge of the capacitor is less than a threshold charge.

3. The system of claim 1, comprising the controller to:
   identify a start-up condition; and
   cause the thermal component to charge the electrical component responsive to the start-up condition.

4. The system of claim 1, wherein the thermal component comprises a heater, comprising the controller to:
   identify a temperature condition corresponding to the battery; and
   cause the heater to provide heat to the battery, responsive to the temperature condition satisfying a threshold criteria.

5. The system of claim 1, wherein the controller causes the thermal component to activate for the first predetermined duration to provide charge and wherein the controller causes the thermal component to activate for the second duration to provide heat to the battery, the second duration being a second predetermined duration.

6. The system of claim 1, wherein the thermal component is provided to receive power from the battery, to charge the electrical component and to transfer thermal energy with the battery.

7. The system of claim 1, comprising:
a relay configured to selectively couple the electrical component with a negative terminal of the battery to cause a steady-state current to flow through the thermal component, the relay being disposed between the thermal component and the negative terminal;
a negative contactor disposed between the relay and the negative terminal;
a positive contactor disposed between the thermal component and a positive terminal, the positive contactor configured to close to cause the battery to receive energy from the stationary power source; and
the controller to:
close the relay, close the negative contactor, and close the positive contactor, while the thermal component transfers thermal energy with the battery; and
open the relay with the negative contactor and the positive contactor closed to charge the battery.

8. The system of claim 1, comprising:
a relay disposed between the thermal component and a positive terminal;
a negative contactor disposed between the relay and the negative terminal; and
the controller to close the relay and close the negative contactor, while the thermal component charges the electrical component.

9. The system of claim 1, comprising:
the controller to control one or more relays and one or more contactors, responsive to the electrical component being charged above a threshold.

10. The system of claim 1, comprising:
the controller to control one or more relays and a fourth signal to one or more contactors, responsive to the battery being heated to above a first threshold temperature or the battery being cooled to below a second threshold temperature.

11. A method, comprising:
causing, by a controller, a thermal component, arranged to interface with a battery and an electrical component disposed across terminals for a stationary power source configured to charge the battery, to charge the electrical component for a first predetermined duration; and
causing, by the controller, the thermal component to, prior to electrically coupling the stationary power source with the battery, transfer thermal energy with the battery for a second duration, greater than the first predetermined duration.

12. The method of claim 11, comprising:
providing the thermal component intermediary to the battery and the electrical component.

13. The method of claim 11, comprising:
identifying, by the controller, a start-up condition; and
causing, by the controller, the thermal component to charge the electrical component responsive to the start-up condition.

14. The method of claim 11, wherein the thermal component comprises a cooling component, comprising:
identifying, by the controller, a temperature condition corresponding to the battery; and
causing, by the controller, the cooling component to draw heat from the battery, responsive to the temperature condition satisfying a threshold criteria.

15. The method of claim 11, comprising:
determining, by the controller responsive to causing the thermal component to charge the electrical component, that the electrical component is charged above a threshold; and
controlling, by the controller, one or more relays and a one or more contactors, responsive to the electrical component being charged above the threshold.

16. The method of claim 11, comprising:
determining, by the controller responsive to causing the thermal component, that a temperature condition of the battery satisfies a threshold criteria; and
controlling, by the controller, one or more relays and one or more contactors, responsive to the temperature condition satisfying the threshold criteria.

17. The method of claim 11, wherein the electrical component comprises a capacitor, the method comprising:
determining, by the controller, that the capacitor has a charge which is less than a threshold charge; and
causing, by the controller, the thermal component to charge the capacitor.

18. The method of claim 11, comprising:
providing a power converter to receive power from a power source, the power converter comprising the electrical component;
providing the battery to receive power from the power converter; and
providing the thermal component to receive power from the battery, to charge the electrical component and to transfer thermal energy with the battery.

19. The method of claim 11, comprising:
causing, by the controller, the thermal component to activate for a first duration, to cause the thermal component to charge the electrical component; and
causing, by the controller, the thermal component to activate the thermal component for a second duration greater than the first duration, to cause the thermal component to transfer thermal energy with the battery, wherein the second duration exceeds the first duration.

20. A power distribution device, comprising:
a thermal component configured to interface with a battery and an electrical component disposed across terminals for a stationary power source configured to charge the battery; and
a controller configured to, prior to electrically coupling the stationary power source with the battery:
cause the thermal component to charge the electrical component for a first predetermined duration; and
cause the thermal component to transfer thermal energy with the battery for a second duration greater than the first predetermined duration.

* * * * *